United States Patent
Ohkoshi (10) Patent No.: US 8,028,578 B2
(45) Date of Patent: *Oct. 4, 2011

(54) COMPOSITE SENSOR

(75) Inventor: Hideo Ohkoshi, Osaka (JP)

(73) Assignee: Panasonic Corporation, Osaka (JP)

( * ) Notice: Subject to any disclaimer, the term of this patent is extended or adjusted under 35 U.S.C. 154(b) by 473 days.

This patent is subject to a terminal disclaimer.

(21) Appl. No.: 12/281,269

(22) PCT Filed: Mar. 14, 2007

(86) PCT No.: PCT/JP2007/055030
§ 371 (c)(1),
(2), (4) Date: Aug. 29, 2008

(87) PCT Pub. No.: WO2007/108374
PCT Pub. Date: Sep. 27, 2007

(65) Prior Publication Data
US 2009/0013784 A1    Jan. 15, 2009

(30) Foreign Application Priority Data

Mar. 17, 2006 (JP) .................................. 2006-073803

(51) Int. Cl.
*G01P 1/02* (2006.01)
*G01P 9/08* (2006.01)
*G01C 19/56* (2006.01)

(52) U.S. Cl. .................... 73/493; 73/514.29; 73/504.16; 73/511

(58) Field of Classification Search .................... 73/493, 73/510, 511, 504.16, 514.29, 514.32, 504.12, 73/431

See application file for complete search history.

(56) References Cited

U.S. PATENT DOCUMENTS

| 5,392,650 | A * | 2/1995 | O'Brien et al. | 73/514.18 |
| 5,996,409 | A * | 12/1999 | Funk et al. | 73/504.04 |
| 6,474,162 | B1 * | 11/2002 | Voss et al. | 73/504.16 |
| 7,028,547 | B2 * | 4/2006 | Shiratori et al. | 73/495 |
| 7,155,975 | B2 * | 1/2007 | Mitani et al. | 73/504.03 |
| 7,243,561 | B2 * | 7/2007 | Ishigami et al. | 73/866.1 |
| 7,281,406 | B2 * | 10/2007 | Mase | 73/1.37 |
| 7,325,454 | B2 * | 2/2008 | Saito et al. | 73/511 |
| 7,845,226 | B2 * | 12/2010 | Ohkoshi | 73/493 |

FOREIGN PATENT DOCUMENTS

JP    07-225242    8/1995

(Continued)

OTHER PUBLICATIONS

International Search Report for PCT/JP2007/055030; completed on Apr. 26, 2007.

*Primary Examiner* — Helen C. Kwok
(74) *Attorney, Agent, or Firm* — Pearne & Gordon LLP (57) ABSTRACT

A composite sensor includes an angular velocity sensor element, an acceleration sensor element, a signal processing IC for processing signals from the angular velocity sensor element and the acceleration sensor element, an inner package for accommodating the angular velocity sensor element, the acceleration sensor element, and the signal processing IC; a coupler connected to this inner package, and a fixing member connected to this coupler for holding the inner package via this coupler. The coupler is elastically deformable. One of the acceleration sensor element and the signal processing IC is located at the right with respect to the center of the inner package, and the other of the acceleration sensor element and the signal processing IC is located at the left with respect to the center of the inner package. The composite sensor angular maintains its characteristics of the angular velocity sensor element while the angular velocity sensor element and the acceleration sensor element are accommodated in one package.

3 Claims, 5 Drawing Sheets

FOREIGN PATENT DOCUMENTS

| | | |
|---|---|---|
| JP | 08-021851 | 1/1996 |
| JP | 10-332387 | 12/1998 |
| JP | 11-108948 | 4/1999 |
| JP | 11-510895 | 9/1999 |
| JP | 11-281361 | 10/1999 |
| JP | 2003-004450 | 1/2003 |
| JP | 2003-227844 | 8/2003 |
| WO | 97-06412 | 2/1997 |

* cited by examiner

COMPOSITE SENSOR

TECHNICAL FIELD

The present invention relates to a composite sensor for detecting an angular velocity and an acceleration mainly used in a navigation system for a vehicle, such as an automobile, various controls of a vehicle, or a shaking detector of a camera.

BACKGROUND ART

A composite sensor including an angular velocity sensor element and an acceleration sensor element which are accommodated in one package is known (Patent Document 1).

A sensor to be angled to be mounted in a vehicle is known. This sensor has a detection axis coinciding with a vertical direction while being mounted in the vehicle. (Patent Document 2).

An acceleration sensor including an acceleration sensor element which includes a mass portion having a weight and an elastically-deformable portion having an end fixed is known. The mass portion has a thickness different from that of the deformable portion, hence causing the center of gravity to deviate from a plane parallel to the deformable portion. The sensor element is inclined to prevent a vertical component of an acceleration from influencing a direction in which the acceleration is to be detected. (Patent Document 3).

In each of the above composite sensors, an angular velocity sensor and an acceleration sensor are accommodated preferably in one package, and an acceleration is preferably transmitted directly to the acceleration sensor. If a damper is not mounted to the case, vibration and impact are applied to the angular velocity sensor element directly from outside, and disturb predetermined vibration of the angular velocity sensor, accordingly causing detection accuracy to deteriorate.

Patent Document 1: JP 2003-4450A
Patent Document 2: JP 11-281361A
Patent Document 3: JP 7-225242A

SUMMARY OF THE INVENTION

The present invention solves the above problem, and aims to provide a composite sensor including an angular velocity sensor element and an acceleration sensor element which are accommodated in one package while maintaining characteristic of the angular velocity sensor.

A composite sensor according to an aspect of the present invention includes an angular velocity sensor element, an acceleration sensor element, a signal processing IC for processing signals from the angular velocity sensor element and the acceleration sensor element, an inner package for accommodating the angular velocity sensor element, the acceleration sensor element, and the signal processing IC, a coupler that is connected to the inner package and that is elastically-deformable, and a fixing member connected to the coupler for holding the inner package via the coupler. The composite sensor has a structure in which one of the acceleration sensor element and the signal processing IC is located at the right side with respect to the center of the inner package and the other of the acceleration sensor element and the signal processing IC is located at the left with respect to the center of the inner package. This structure thus separates such heavy components to the left and right in the inner package. This structure increases the moment of inertia moment while positioning the center of gravity of the inner package at the center of the inner package. This arrangement prevents the package from rotating around the center axis of the inner package. This prevents a noise component from being mixed in a detection signal of an angular velocity, thus preventing the angular velocity from having detection accuracy deteriorate.

A composite sensor according to another aspect of the present invention includes the coupler made of material elastically deforming to deflect. The angular velocity sensor element vibrates to produce a Coriolis force to detect an angular velocity. The angular velocity sensor element vibrates in a direction perpendicular to a direction along which the coupler deflects. A detection direction of the acceleration sensor element is parallel to the direction along which the angular velocity sensor element vibrates. In this structure, the acceleration sensor element has a detection axis perpendicular to the direction along which the coupler deflects. Since the coupler deflects little in directions perpendicular to the direction along which the coupler deflects, an acceleration applied to the composite sensor is substantially transmitted directly to the acceleration sensor element, thus preventing detection accuracy from deteriorating.

A composite sensor according to still another aspect of the present invention includes the angular velocity sensor element and the acceleration sensor element which are inclined in the inner package. This arrangement allows the angular velocity sensor element to have a detection axis in the vertical direction and allows the acceleration sensor element to have a detection axis in a direction along which the vehicle proceeds even when a device having the composite sensor mounted therein is inclined to be mounted in a vehicle, thereby maintaining detection accuracy.

REFERENCE NUMERALS

1 Angular Velocity Sensor Element
2 Acceleration Sensor Element
3 Signal Processing IC
4 Inner Package
7 Coupler
8 Fixing Member

DETAILED DESCRIPTION OF THE PREFERRED EMBODIMENTS

Exemplary Embodiment 1

Exemplary Embodiment 1 of the present invention will be described below.

Figure 1:
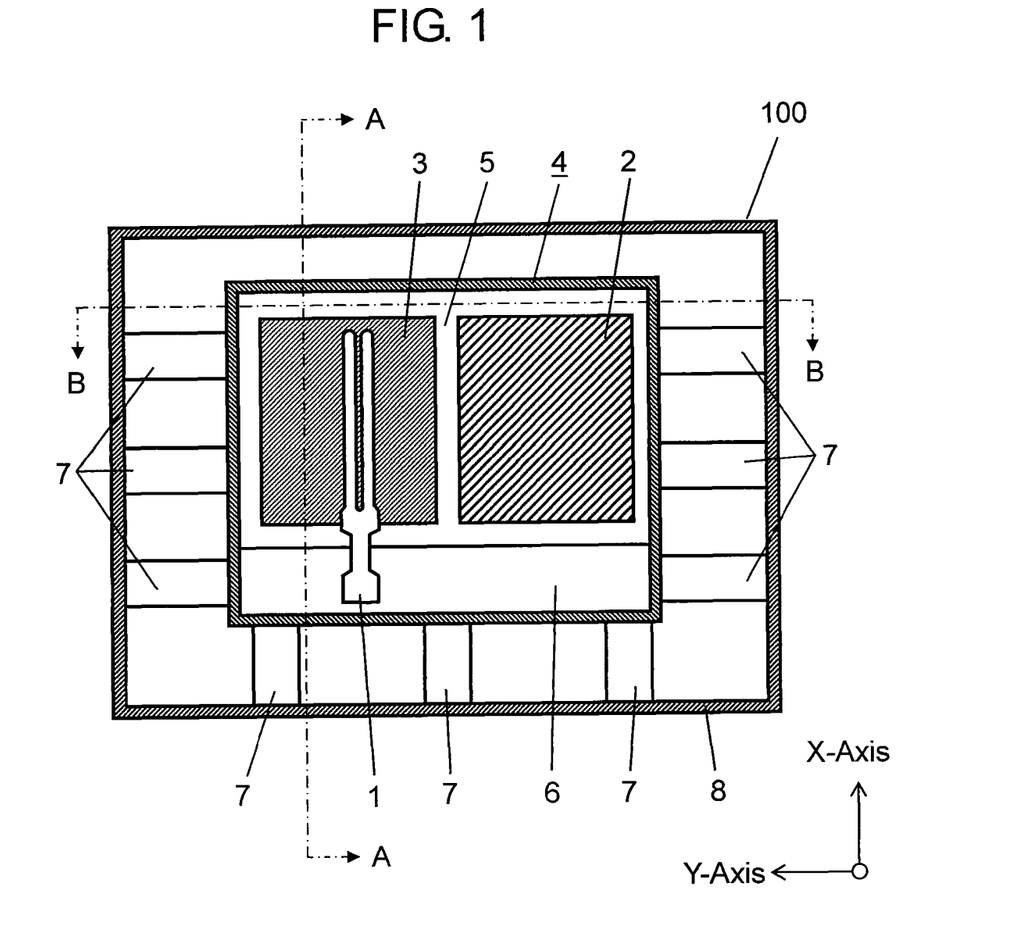
FIG. 1 is a cross-sectional view of a composite sensor according to Exemplary Embodiment 1 of the present invention.
Figure 2:
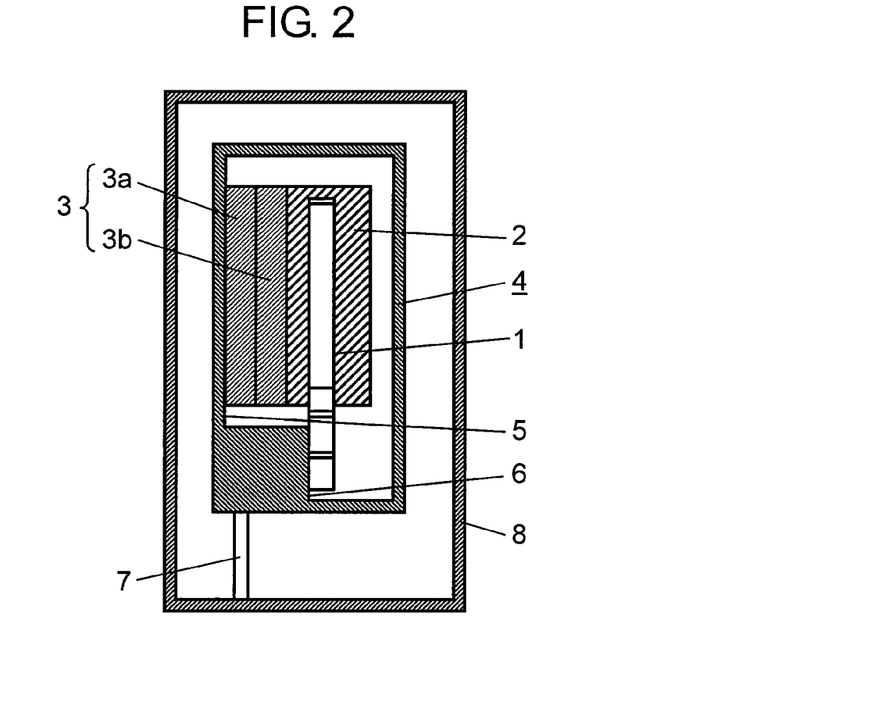
FIG. 2 is a cross-sectional view of the sensor at line A-A shown in FIG. 1.
Figure 3:
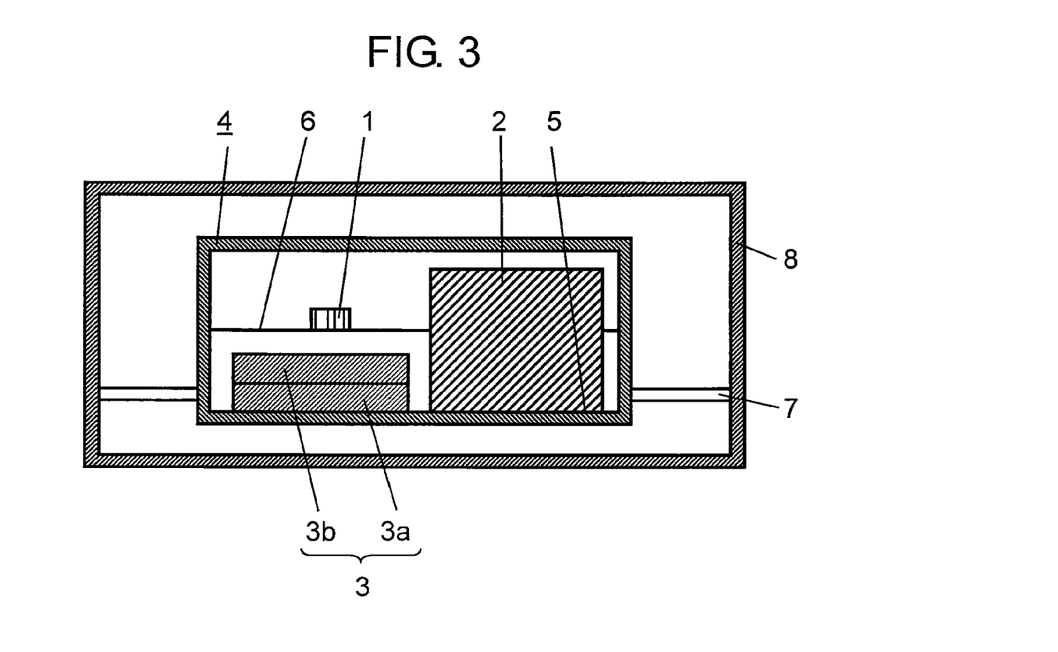
FIG. 3 is a cross-sectional view of the sensor at line B-B shown in FIG. 1.

FIG. 1 is a cross-sectional view of composite sensor 100 according to Embodiment 1 of the invention. FIG. 2 is a cross-sectional view of the sensor at line A-A shown in FIG. 1. FIG. 3 is a cross-sectional view of the cross section at line B-B shown in FIG. 1.

As shown in FIGS. 1 to 3, composite sensor 100 includes angular velocity sensor element 1 having a tuning fork shape, acceleration sensor element 2 having a substantially rectangular parallelepiped shape, and signal processing IC 3 for processing signals from angular velocity sensor element 1 and acceleration sensor element 2. Signal processing IC 3 includes first IC section 3a as one IC and second IC section 3b as another other IC stacked on the first IC section.

Angular velocity sensor element 1, acceleration sensor element 2, and signal processing IC 3 are accommodated in inner package 4. Signal processing IC 3 is mounted to a portion of inner wall surface 5 of inner package 4. Acceleration sensor element 2 is mounted to a portion of inner wall surface 6. Inner package 4 is connected to fixing member 8 via coupler 7. Coupler 7 is made of elastic material which is elastically deformable, and thus, can deflect in front and back directions across the sheet having FIG. 1 thereon. As shown in FIG. 1, couplers 7 are mounted to the left and right sides and the lower side of inner package 4. Fixing member 8 holds inner package 4 via coupler 7.

In FIG. 1, the X-axis represents a direction of a detection axis of angular velocity sensor element 1. Angular velocity sensor element 1 detects a rotation around an axis parallel to this X-axis. The X-axis is an axis in the up-and-down direction in FIG. 1. The Y-axis represents a direction of a detection axis of acceleration sensor element 2. Acceleration sensor element 2 detects an acceleration in a direction parallel to the Y-axis. The Y-axis extends in the lateral direction of FIG. 1 having a left side representing a positive side. The X-axis is perpendicular to the Y-axis.

Figure 4:
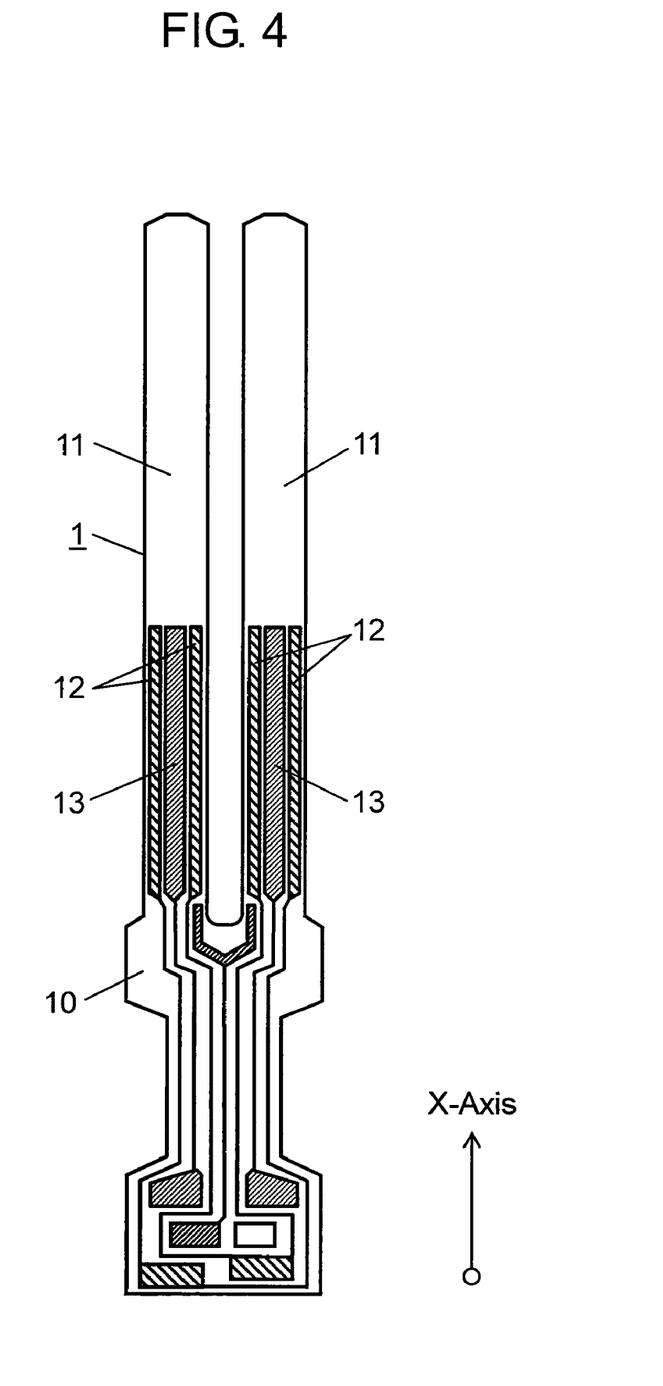
FIG. 4 is a top view of an angular velocity sensor element of the composite sensor according to Embodiment 1.

FIG. 4 is a top view of angular velocity sensor element 1 of composite sensor 100 according to Embodiment 1 of the invention. Angular velocity sensor element 1 has tuning fork base 10 made of Si having a tuning fork shape. Legs 11 are provided at a tip of tuning fork base 10. Two driving electrodes 12 are provided on an end of an upper surface of each of legs 11. Detection electrode 13 is provided between two driving electrodes 12. Each of driving electrodes 12 and detection electrode 13 includes a ground electrode (not shown) on tuning folk base 10 and a PZT layer (not shown).

Figure 5:
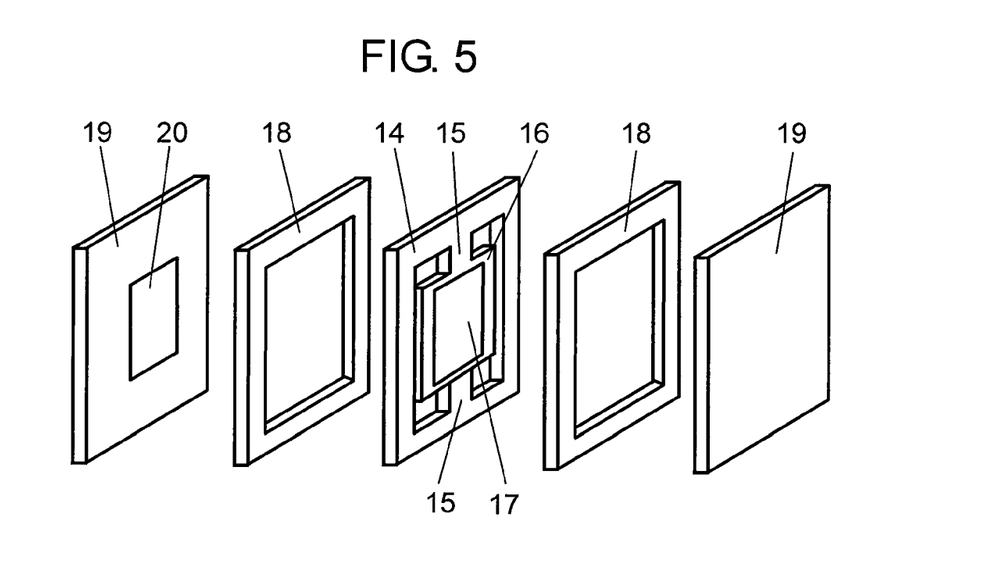
FIG. 5 is an exploded perspective view of an acceleration sensor element of the composite sensor according to Embodiment 1.
Figure 6:
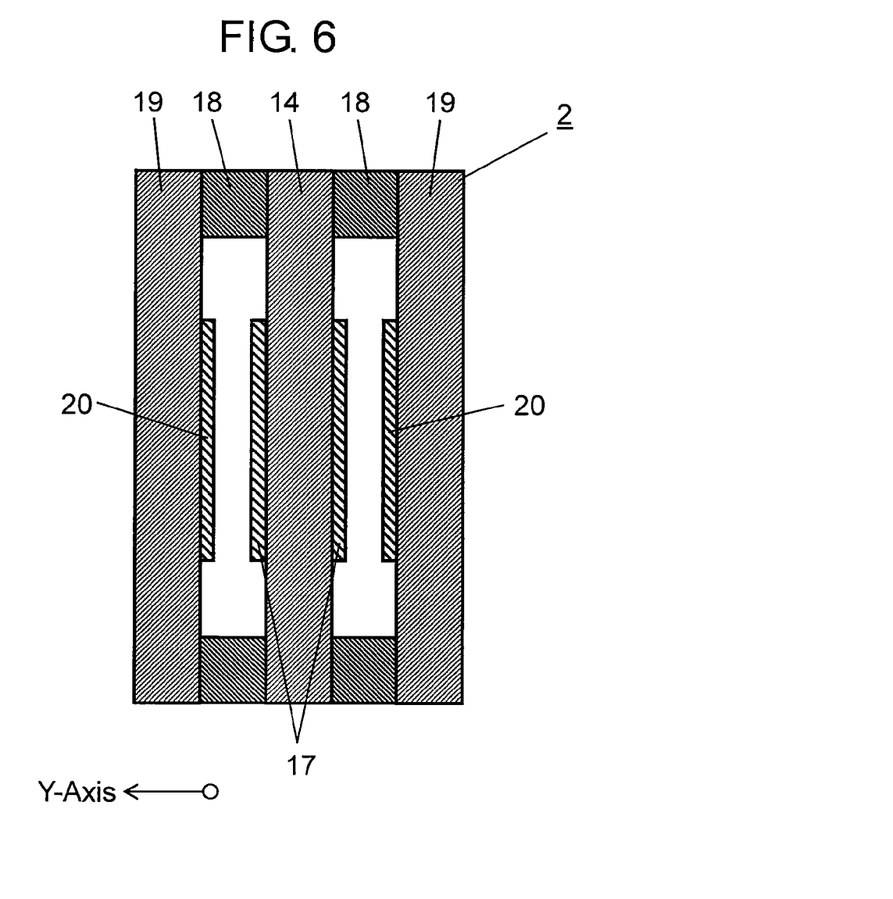
FIG. 6 is a cross-sectional view of the acceleration sensor element according to Embodiment 1.

FIG. 5 is an exploded perspective view of the acceleration sensor element of composite sensor 100. FIG. 6 is a longitudinal cross-sectional view of the acceleration sensor element. FIG. 6 shows the cross section of acceleration sensor element 2 in the same direction of acceleration sensor element 2 shown in FIG. 1.

As shown in FIGS. 5 and 6, acceleration sensor element 2 includes frame 14 made of Si, two beams 15 provided unitarily with frame 14, mass portion 16 supported with two beams 15, and movable electrodes 17 provided on front and back surfaces of mass portion 16. Acceleration sensor element 2 further includes spacers 18 provided on front and back surfaces of frame 14 to sandwich frame 14. Spacers 18 have openings at centers thereof. Flat plates 19 are provided at outer sides of two spacers 18. Fixed electrodes 20 provided on flat plates 19 face movable electrodes 17.

An operation of composite sensor 100 according to Embodiment 1 of the invention will be described below.

Composite sensor 100 according to this embodiment has angular velocity sensor element 1 detect an angular velocity. A voltage having a predetermined frequency is applied to driving electrodes 12 of angular velocity sensor element 1 to cause the PZT layer (not shown) made of piezoelectric material to deform, thereby causing legs 11 to vibrate in the lateral directions in FIG. 4. The angular velocity produced by the rotation about the X-axis is applied to the vibrating detector element, and produces a Coriolis force applied to legs 11 in the front and back directions across the sheet having FIG. 4 thereon. This force in the front and back directions across the sheet having FIG. 4 thereon changes an electric potential of the PZT layer (not shown), and the change of the potential is detected through detection electrode 13. Then, this detected signal can be subjected to a predetermined processing by signal processing IC 3 to detect the angular velocity. The Coriolis force is an apparent force applied to an object moving in a rotating coordinate system, and is generated in a direction perpendicular to a direction along which an object having a predetermined mass moves while the object moves in a coordinate system rotating at a constant angular velocity.

Composite sensor 100 according to this embodiment has acceleration sensor element 2 detect an acceleration.

When a positive acceleration in the left direction in FIG. 6 is applied, mass portion 16 moves relatively to the right in acceleration sensor element 2 due to its inertia. This movement decreases an interval between movable electrode 17 at the right and fixed electrode 20 and increases an interval between movable electrode 17 at the left and fixed electrode 20, thereby changing the capacitances between the electrodes. Signal processing IC 3 performs a predetermined signal processing to a signal corresponding to the change of the capacitances to detect the acceleration.

An operation of composite sensor 100 having an impact from outside applied thereto will be described below.

When an impact in the front and back directions across the sheet having FIG. 1 thereon is applied to composite sensor 100, couplers 7 absorbs a part of the impact. However, a certain part of the impact is transmitted to inner package 4 held with couplers 7, and moves inner package 4 even by a small distance within fixing member 8 in the front and back directions across the sheet having FIG. 1 thereon. If the moment of inertia about the center axis of inner package 4 is small or if when the center of gravity of the inner package significantly deviates from the center axis and is positioned at an end of the inner package, the following problem may occur. Inner package 4 may not move in parallel to the front and back directions, but may have the left end move to the back and have the right end move to the front, thus rotating. This rotation is identical to the angular velocity about the vertical up and down directions in FIG. 1 to be applied to composite sensor 100, and hence, is added as a noise component to the detection signal of the angular velocity, thus deteriorating the detection accuracy. This problem occurs not only when the impact in the front and back directions across the sheet having FIG. 1 thereon is applied to composite sensor 100 but also when other impacts in the up and down directions and in the left and right directions are applied to composite sensor 100.

In order to solve the above problem, composite sensor 100 according to Embodiment 1 of the invention includes signal processing IC 3 located at the left side from the center of inner package 4 and acceleration sensor element 2 located at the right side from the center of inner package 4.

In other words, acceleration sensor element 1 is located in one space with respect to the center of inner package 4, and signal processing IC 3 is located in the other space with respect to the center of inner package 4. Specifically, these heavy components are separately located at the left and right in inner package 4, thereby positioning the center of gravity of inner package 4 at the center of inner package 4. Thus, inner package 4 has the center of gravity positioned at the center of inner package 4. Specifically, the center of gravity of inner package 4 may be positioned within a range from the center to ¼ of the length in the lateral direction of inner package 4 towards the left and right. The center of gravity of inner package 4 is positioned preferably within a range from the center to ⅙ of the length in the lateral direction of inner package 4 towards the left and right. The center of gravity of inner package 4 is positioned more preferably within a range from the center to ⅛ of the length in the lateral direction of inner package 4 towards the left and right. This structure positions the center of gravity substantially at the center of the inner package, and increases the moment of inertia of the inner package. Hence, the noise component is not added to the detection signal of the angular velocity, thus preventing the detection accuracy of the angular velocity from deteriorating.

According to Embodiment 1 of the present invention, coupler 7 is made of elastic material. The elastic material allows coupler 7 to deflect. The elastic material may employ rubber or thermoplastic elastomer, and may be spring material, such as a coil spring.

Angular velocity sensor element 1 vibrates in the direction perpendicular to the direction along which coupler 7 deflects. The direction detection of acceleration sensor element 2 is parallel to the direction along which angular velocity sensor element 1 vibrates. Thus, acceleration sensor element 2 has the detection axis perpendicular to the direction along which coupler 7 deflects. Couplers 7 deflect little in the direction of the detection axis of acceleration sensor element 2. Consequently, the acceleration applied to the composite sensor is substantially transmitted directly to acceleration sensor element 2, thus preventing detection accuracy from deteriorating.

Exemplary Embodiment 2

Exemplary Embodiment 2 of the present invention will be described below.

Figure 7:
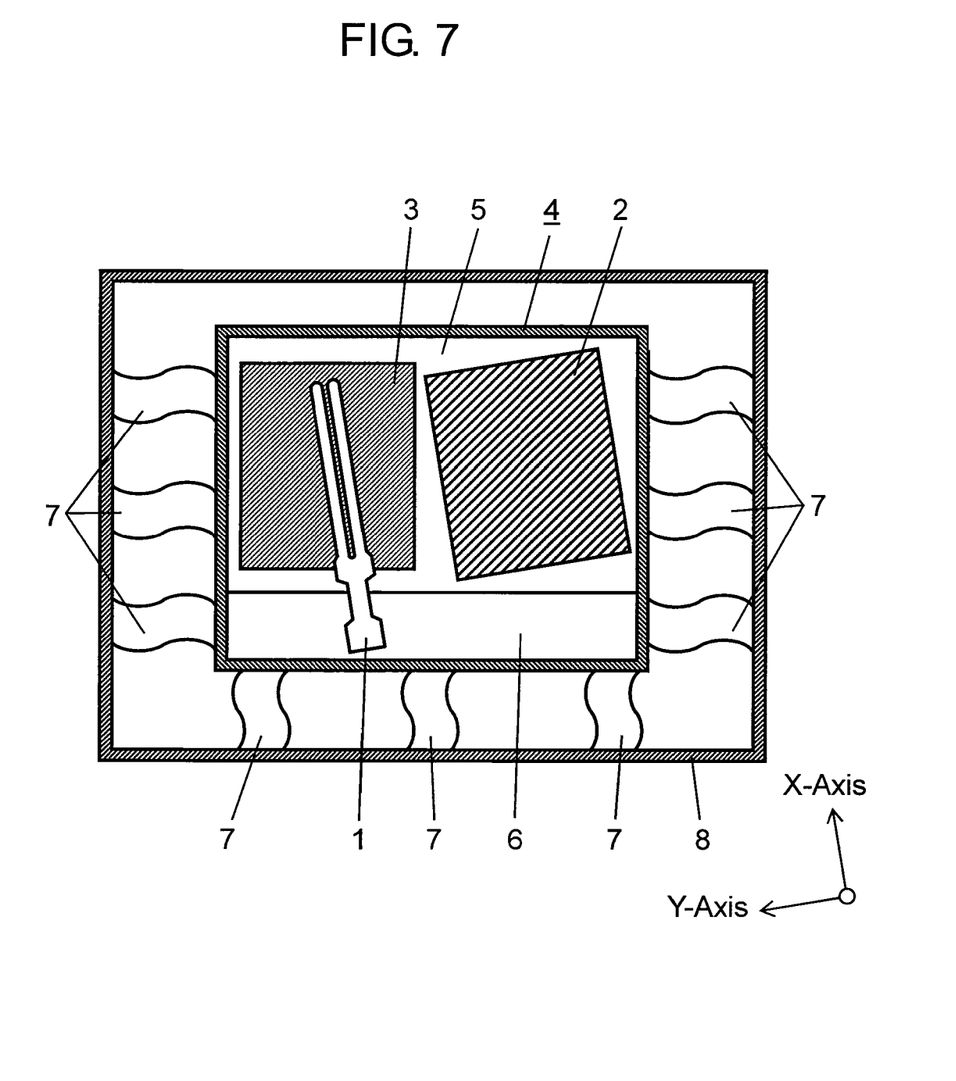
FIG. 7 is a plane section view of a composite sensor according to Exemplary Embodiment 2 of the invention.

FIG. 7 is a plane section view of a composite sensor according to Embodiment 2 of the invention. In FIG. 7, constituents identical to those of Embodiment are denoted by the same reference numerals, and their description will be omitted. In FIG. 7, the X-axis and the Y-axis are perpendicular to each other.

The composite sensor according to Embodiment 2 of the invention is different from the composite sensor according to Embodiment 1 in that angular velocity sensor element 1 and acceleration sensor element 2 are inclined in inner package 4, and coupler 7 has an S-shape.

When the composite sensor according to Embodiment 2, different from the composite sensor according to Embodiment, the X-axis and the Y-axis incline, and both of angular velocity sensor element 1 and angular velocity sensor element 2 have inclined detection axes. This structure improves detection accuracy when the composite sensor is mounted to a moving object, such as a vehicle. This will be described below.

The composite sensor may be mounted to a center console in an automobile. In this case, the center console often inclines to have an operation surface directed in an obliquely upward direction for operability for users or due to the size of the console. Thus, the composite sensor may often be mounted obliquely. The composite sensor is preferably mounted to the automobile such that angular velocity sensor element 1 has a detection axis in the vertical direction, and acceleration sensor element 2 has a detection axis parallel to the direction along which the automobile proceeds. The detection axes, upon deviating from these directions, have the detection accuracies deteriorate. While the composite sensor is mounted to the automobile, angular velocity sensor element 1 and acceleration sensor element 2 are inclined to be mounted, such that the X-axis is in the vertical direction and the Y-axis is in the direction along which the automobile proceeds. This arrangement maintains the detection accuracy even when the composite sensor is inclined to be mounted to the center console of the automobile.

Coupler 7 having the S-shape according to Embodiment 2 of the invention assures a distance within which coupler 7 can extend in a limited space for accommodating coupler 7, thus allowing the composite sensor to have a small size.

As described above, the composite sensors according to the invention has a structure in which one of the acceleration detection element and the signal processing IC is provided at the right from the center of the inner package, and the other of the acceleration detection element and the signal processing IC is provided at the left from the center of the inner package. Such heavy components are thus separated to the left and right in the inner package so as to position the center of gravity at the center of the inner package and increase the moment of inertia. This arrangement prevents the noise component from being mixed in the detection signal of the angular velocity, accordingly preventing detection accuracy for the angular velocity from deteriorating.

Industrial Applicability

A composite sensor according to the present invention includes an angular velocity sensor element and an acceleration sensor element which are accommodated in one package, and is useful for various sensing sensors for vehicle or for digital cameras.

The invention claimed is:
1. A composite sensor comprising;
an angular velocity sensor element;
an acceleration sensor element;
a signal processing IC for processing signals from the angular velocity sensor element and the acceleration sensor element;
an inner package for accommodating the angular velocity sensor element, the acceleration sensor element, and the signal processing IC;
a coupler connected to the inner package, the coupler being elastically deformable; and
a fixing member connected to the coupler for holding the inner package via the coupler, wherein
the acceleration sensor element is located in one space in the inner package with respect to a center of the inner package,
the signal processing IC is located in another space in the inner package with respect to the center of the inner package,
the inner package has a center of gravity at a center of the inner package.

2. The composite sensor according to claim 1, wherein the coupler is made of elastic material,
the angular velocity sensor element is configured to vibrate to detect an angular velocity according to a Coriolis force produced thereon,
the angular velocity sensor element vibrates in a direction perpendicular to a direction along which the coupler deflects, and
a detection direction of the acceleration sensor element is parallel to the direction along which the angular velocity sensor element vibrates.

3. The composite sensor according to claim 1 or 2, wherein the angular velocity sensor element and the acceleration sensor element is inclined in the inner package.

* * * * *